United States Patent [19]

Brown et al.

[11] Patent Number: 4,623,897

[45] Date of Patent: Nov. 18, 1986

[54] INK JET AIR-SKIVING START-UP SYSTEM

[75] Inventors: Mark E. Brown, West Carrollton; Bruce W. Gamble, Fairborn; Michael J. Piatt, Enon; Randy D. Vandagriff, Fairborn, all of Ohio

[73] Assignee: Eastman Kodak Company, Rochester, N.Y.

[21] Appl. No.: 722,545

[22] Filed: Apr. 12, 1985

[51] Int. Cl.⁴ .............................................. G01D 15/18

[52] U.S. Cl. .................................. 346/75; 346/140 R

[58] Field of Search .............................. 346/75, 140 R

[56] References Cited

U.S. PATENT DOCUMENTS 4,122,457 10/1978 Erikson et al. ........................ 346/75

4,231,046 10/1980 Aiba ...................................... 346/75

4,430,658 2/1984 Fukazawa et al. .................. 346/75

*Primary Examiner*—E. A. Goldberg

*Assistant Examiner*—Gerald E. Preston

*Attorney, Agent, or Firm*—John D. Husser

[57] ABSTRACT

Ink jet printing apparatus having an improved system for start-up or maintenance includes elements for adjusting ink flow to impact on lower print head structure and elements for thereafter air skiving the ink from that structure.

16 Claims, 7 Drawing Figures

INK JET AIR-SKIVING START-UP SYSTEM

BACKGROUND OF THE INVENTION

1. Field of the Invention

The present invention relates to ink jet printing apparatus, e.g. of the continuous type, and more specifically to a structural and functional system that provides improved start-up/shut-down modes for such apparatus.

2. Description of the Prior Art

The term "continuous" has been used in the field of ink jet printer apparatus to characterize the types of ink jet printers that utilize continuous streams of ink droplets, e.g in distinction to the "drop on demand" types. Continuous ink jet printers can be of the binary type (having "catch" and "print" trajectories for droplets of the continuous streams) and of the multi-deflection type (having a plurality of print trajectories for droplets of the continuous streams). Binary type apparatus most often employs a plurality of droplet streams while multi-deflection apparatus most often employs a single droplet stream.

In general, continuous ink jet printing apparatus have an ink cavity to which ink is supplied under pressure so as to issue in a stream(s) from an orifice plate in liquid communication with the cavity. Periodic perturbations are imposed on the liquid stream(s), e.g. vibrations by an electromechanical transducer, to cause the stream(s) to break up into uniformly sized and shaped droplets. A charge plate is located proximate the stream(s) break-off point to impart electrical charge in accord with a print information signal and charged droplets are deflected from their nominal trajectory. In one common (binary) printing mode, charged droplets are deflected into a catcher assembly and non-charged droplets proceed to the print medium.

The components described above (particularly the orifice plate and charge plate) should be precisely sized and positioned to achieve accurate placement of droplets on the print medium or on the catcher face. However, even after such careful manufacture, significant problems often are presented at each operational start-up of ink jet printers. First, any dried ink residue remaining from previous usage presents serious problems. For example, if such residue is on the charge plate it can cause shorting or improper charging of droplets or interfere with the droplet trajectory. If the residue is on the lower print head structure (e.g. the operative catcher surface), it can cause ink splatter. Also, it is quite difficult to initiate the continuous droplet stream(s) along their nominal trajectories, without some initial jet instability causing a partial wetting of the charge plate.

Prior art solutions to avoid charge plate shorting due to ink contamination have included (i) manually cleaning the charge plate; (ii) providing a nearly instantaneous negative pressure at shut-down to avoid creating residue on the lower print head; (iii) moving the lower print head charge plate structure away from its operative position at start-up and (iv) providing a rapid pressure pulse in the image bar to force an initially straight start for the ink jets.

These solutions are all useful, but not without related difficulties or disadvantages. Manual cleaning of the charge plate is not desirable, particularly for office environment applications. Moving of the charge plate to avoid wetting during start-up adds mechanical complexity and causes great potential for unaccuracy in its proper alignment with the upper print head assembly's orifice plate. Using the "water-hammer" approach to achieve instantaneous start-up of the jets in their printing trajectory requires an extremely fast-actuation solenoid valve and rigid conduits. This approach is sometimes unreliable in constructions where jet-to-electrode clearances are very small. Instant shut-down of the jets to avoid ink contamination on the charge plate has similar disadvantages and, in itself, will not solve the problem of accumulated residue on the lower print head structure.

SUMMARY OF THE INVENTION

One significant purpose of the present invention is to provide an improved system for starting-up a ink jet printing apparatus without the disadvantages associated with the above-noted prior art solutions. This is accomplished by an approach that is distinctly different from the prior art techniques in that the present invention intentionally utilizes an ink wetting of the charge plate at the inception of start-up.

In one preferred mode, start-up is intentionally initiated with an apparatus mode that causes ink streams issuing from the orifice plate to impact and clean the print head assembly. The present invention then provides for means to remove residual wet ink when the ink jet streams are moved into a not-impacting relation with the lower print head structure, e.g. the charge plate and catcher.

In particularly preferred embodiments the cleaning impact is effected by regulating the jet stream pressure and the removal of residual wet ink is effected by a high velocity air flow, from a source external of the print head ink cavity, that skives the wet ink from the operative surface of the charge plate. To provide such air flow, the print head assembly is preferably designed to cooperate with an air source of an apparatus home-station, adjacent the printing path of the print head.

The present invention is particularly useful in cooperation with printer apparatus having a wet storage system as disclosed in concurrently filed U.S. application Ser. No. 722,551, entitled "Ink Jet Printing Apparatus Having a Wet-Storage System" by M. Piatt; however, it is also useful in printer apparatus having dry storage of the print head assembly.

Thus, in one aspect, the present invention provides in ink jet printing apparatus of the type having a print head with an orifice for producing ink streams and a lower print head structure located proximate the nominal path of such ink stream, the improvement comprising means for adjusting the apparatus so that droplet streams impact on such lower structure and means for introducing high velocity air to skive such lower structure. In one preferred embodiment the present invention includes means providing an engageable source of pressurized air at a start-up station adjacent the printing path of the print head assembly and means on the print head assembly for engaging the air source and directing a high velocity air stream across the operative surfaces of the charge plate assembly. In a particularly preferred embodiment, the present invention provides means for: (i) selectively actuating ink supply means to produce ink flow through said orifice plate at a nominal operating pressure that provides printing ink streams or at a cleaning pressure such that ink is sprayed onto the charge plate; and (ii) selectively actuating the high velocity air flow as the ink streams shift from their cleaning trajectories to their printing trajectories.

DESCRIPTION OF THE DRAWINGS

The subsequent description of preferred embodiments of the present invention refers to the attached drawings wherein.

DETAILED DESCRIPTION OF PREFERRED EMBODIMENTS

Figure 1:
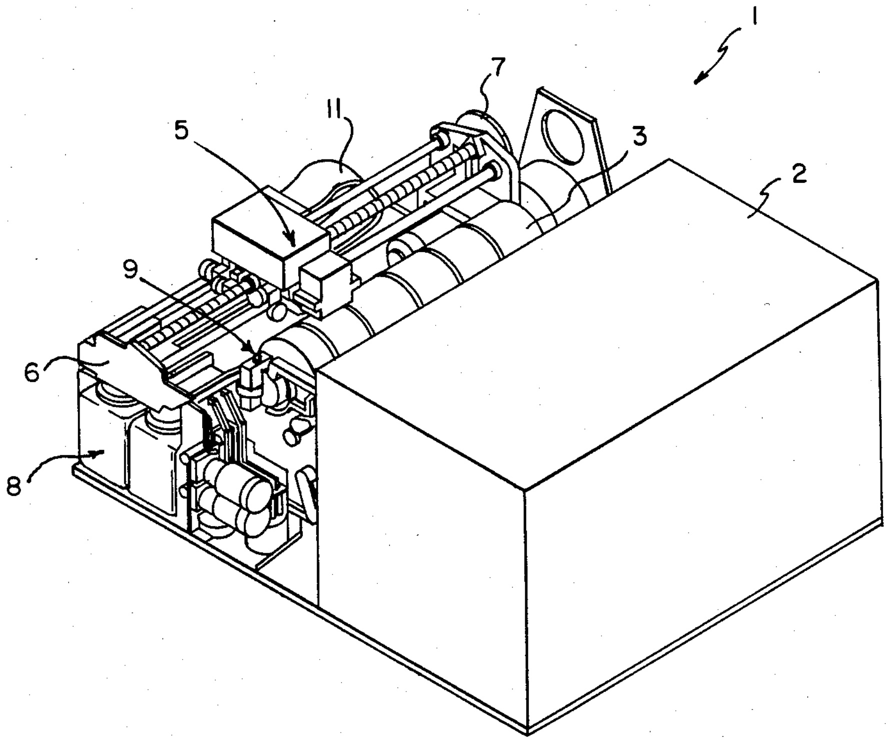
FIG. 1 is a perspective view of one embodiment of ink jet printing apparatus in accord with the present invention.

FIG. 1 illustrates schematically an exemplary ink jet printing apparatus 1 employing one embodiment of the present invention. In general, the apparatus 1 comprises a paper feed and return sector 2 from which sheets are transported into and out of operative relation on printing cylinder 3. The detail structure of the sheet handling components does not constitute an essential part of the present invention and need not be described further.

Also illustrated generally in FIG. 1 is a print head assembly 5 which is mounted for movement on carriage assembly 6 by appropriate drive means 7. During printing operation the print head assembly is traversed across a print path in closely spaced relation to a print sheet which is rotating on cylinder 3. Ink is supplied to and returned from the print head assembly by means of flexible conduits 11 which are coupled to an ink cartridge(s) 8. A storage and start-up station 9 is constructed adjacent the left side (as viewed in FIG. 1) of the operative printing path of print head assembly 5; and the drive means 7 and carriage assembly 6 are constructed to transport particular portions of the print head assembly into operative relations with station 9 at appropriate sequences of the operative cycle of apparatus 1, as will be described in more detail subsequently.

Figure 2:
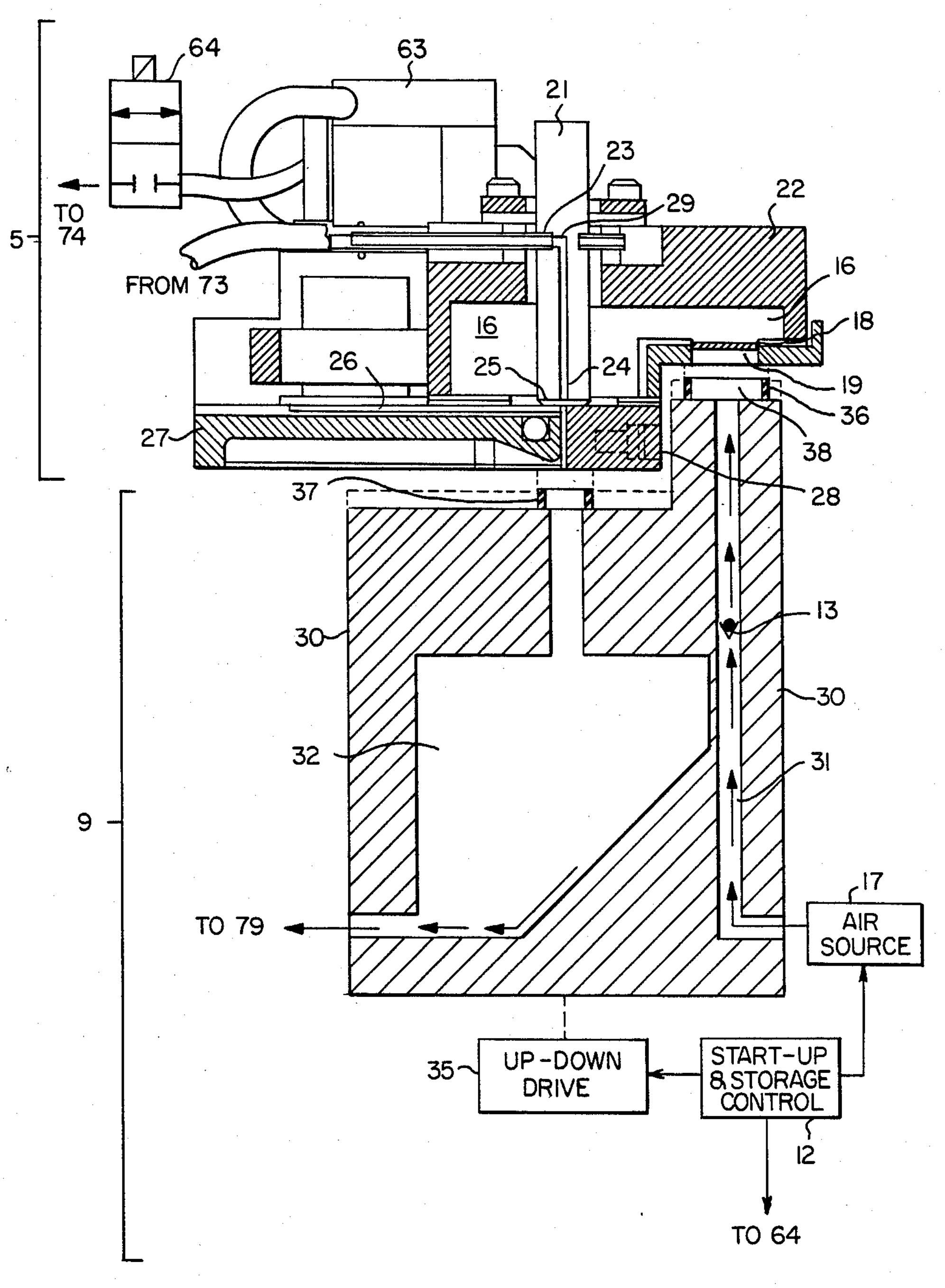
FIG. 2 is a schematic cross-sectional view of a portion of the FIG. 1 apparatus illustrating the upper and lower print head assemblies and their cooperative relation within the storage and start-up station.

Referring to FIG. 2, one embodiment of print head assembly 5 according to the present invention can be seen in more detail. The assembly 5 includes an upper print head portion including a print head body 21 mounted on housing 22 and having an inlet 23 for receiving ink. The body 22 has a passage leading from inlet 23 to one end of print head cavity 24 and an outlet 29, leading from the other end of the cavity 24 to the ink circulation system. The upper print head portion also includes an orifice plate 25 and suitable transducer means (not shown) for imparting mechanical vibration to the body 21 and orifice plate 25. Such transducer can take various forms known in the art for producing periodic perturbations of the ink filament(s) issuing from the orifice plate 25 to assure the break-up of the ink filaments into streams of uniformly spaced ink droplets. Several preferred constructions for the print head body and transducer are disclosed in U.S. application Ser. No. 390,105, entitled "Fluid Jet Print Head" and filed June 21, 1982 in the name of Hilarion Braun; however, a variety of other constructions are useful in accord with the present invention. Preferred orifice plate constructions for use in accord with the present invention are disclosed in U.S. Pat. No. 4,184,925; however, a variety of other orifice constructions are useful.

The lower portion of print head assembly 5 includes a charge plate 26 constructed to impart desired charge upon ink droplets at the point of filament break-up and a droplet catcher device 27 that is constructed and located to catch non-printing droplets (in this arrangement charged droplets). Exemplary preferred charge plate constructions are disclosed in U.S. application Ser. No. 517,608, entitled "Molded Charge Electrode Structure" and filed July 27, 1983 in the name of W. L. Schutrum and in U.S. Pat. No. 4,223,321; however, other charge plate constructions are useful in accord with the present invention. Exemplary catcher configurations are described in U.S. Pat. Nos. 3,813,675; 4,035,811 and 4,268,836, again other constructions are useful. finally, in accord with the present invention, lower print head assembly includes a predeterminedly configured and located wall member 28 that defines an air control passage and a printing outlet region. This structure constitutes an important aspect of the present invention and will be described in much more detail subsequently.

The ink circulation system of the FIG. 1 apparatus includes various ink conduits (i.e. lines) which form an ink recirculation path. As illustrated schematically in FIG. 3, pump inlet line 71 extends from ink supply cartridge 8 to the inlet of pump 60, outlet line 72 extends between pump 60 and a main filter 69, head supply line 73 extends from main filter 69 to the print head inlet 23 and head return line 74 extends from the print head outlet 29 to a junction between catcher return line 75 and the main ink return line 76. An ink return line 79 also extends from start-up and storage station 9 to cartridge 8. An air bleed line 78 extends from main filter 61 back to cartridge 8 and an ink bypass line 77 extends from a juncture with line 73 also back to cartridge 8. As will be clear from the subsequent description, the present invention is not limited to use with the particular ink circulation line arrangement illustrated in FIG. 3. Likewise other elements of the FIG. 3 circulation system, such as ink heater 61, variable flow restrictor 62, final filter 63, temperature sensor(s) 65 and pressure sensor 66 are not necessary for the practice of the present invention, but can be usefully incorporated with it.

Figure 3:
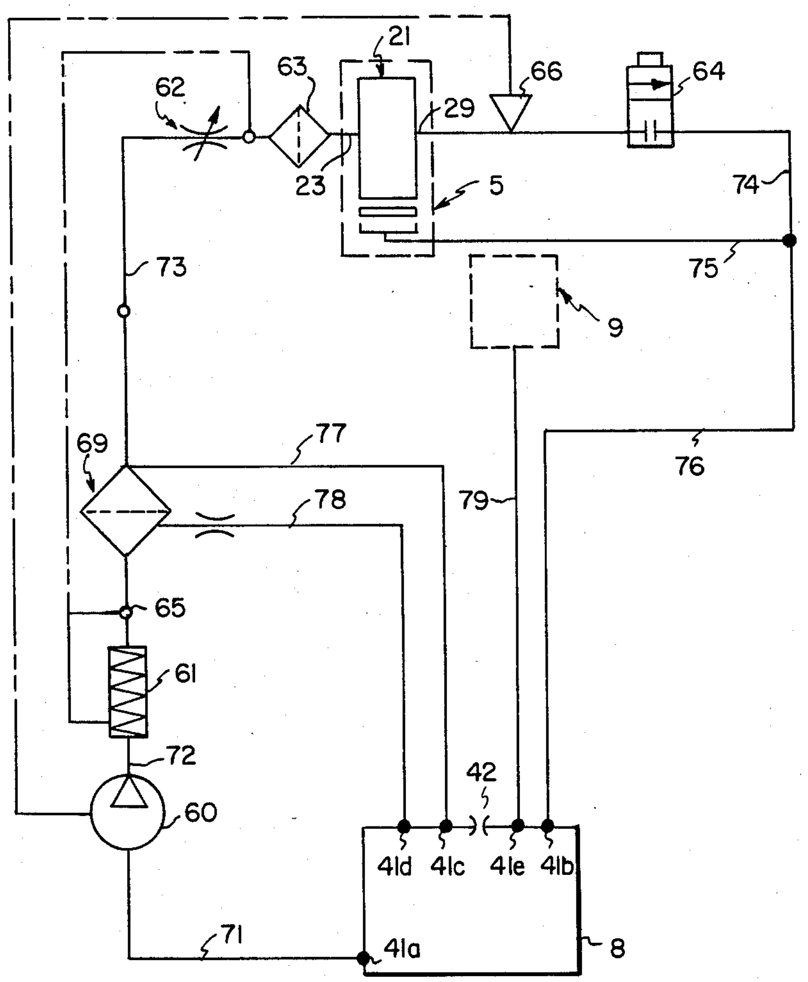
FIG. 3 is a diagrammatic illustration of the ink supply system of the apparatus shown in FIG. 1.
Figure 4:
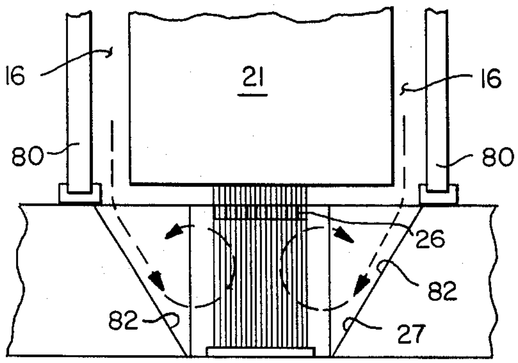
FIG. 4 is a front view of a portion of the apparatus shown in FIG. 2.
Figure 5:
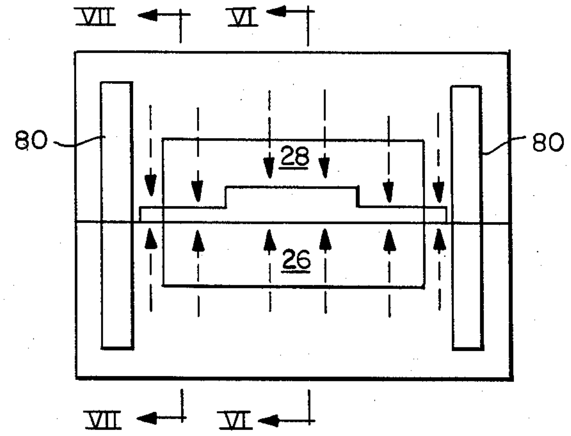
FIG. 5 is a top view of a portion of the apparatus shown in FIG. 2.
Figure 6:
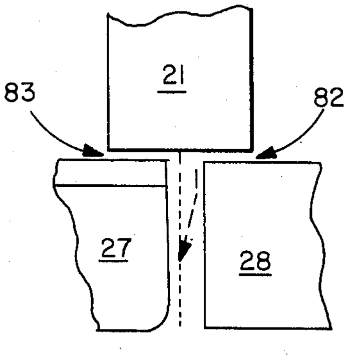
FIG. 6 is a cross-sectional view of the lower print head assembly taken along the line VI—VI in FIG. 5.
Figure 7:
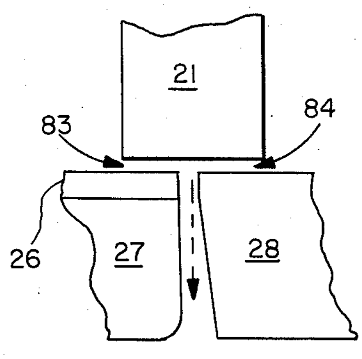
FIG. 7 is a cross-sectional view of the lower print head assembly taken along the line VII—VII in FIG. 5.

As shown in FIGS. 1 and 3, cartridge 8 can be constructed to be readily inserted and removed, as a unit, from operative relation with lines of the ink circulation system. For this purpose suitable couplings 41*a*, 41*b*, 41*c*, 41*d* and 41*e* are formed on the cartridge 8 in a manner so as to operatively connect respectively with lines 71, 76, 77, 78 and 79 upon insertion of the ink cartridge 8 into its mounting in the printer apparatus. Cartridge 8 can have a vent 42 to render its main ink reservoir portion at atmospheric pressure. The cartridge can comprise as a unitary portion a prefilter, which is located between coupling 41*a* and the cartridge interior to filter ink egressing to pump inlet 71 and a venturi portion (not shown) which is constructed to (i) receive ink from bypass line 77 at a venturi inlet (ii) receive ink from line 76 proximate the venturi restriction region and (iii) introduce those ink flows to the atmospheric region of the cartridge interior through a venturi expansion region above the liquid surface.

Further details of the structure and function of cartridge 8 are described in copending U.S. application Ser. No. 722,548, entitled "Ink Supply Cartridge and Cooperative Ink Circulation System of Continuous Ink Jet Printer", and filed Apr. 12, 1985, in the names of J. McCann, M. Piatt and T. Williams. However, the present invention can be equally well utilized in a circulation system utilizing a separate vacuum pump to withdraw ink from the return lines back to the cartridge.

In general, at the beginning of a start-up mode of operation, valve 64 in the head outlet line 74 is open and pump 60 is activated to withdraw ink from the cartridge 8 through line 71. Ink is forced under pressure through the main filter and into head inlet line 73 and bypass line 77. The ink passing into inlet line 73 flows through the print head and into and through the head outlet line 74. The ink passing into bypass line is circulated back into the cartridge 8 and, when cooperating with a cartridge having a venturi, provides a motive force for withdrawing ink back into return line 76.

Heater 61, under the feedback control of sensor 65, conditions the circulating ink to the proper operating temperature and pressure sensor 66 regulates pump 60 to attain the proper dynamic line circulation pressure. The valve 64 in head outlet line 74 is operable to regulate ink flow through the print head and thus can regulate the fluid pressure in the cavity 24 of the print head and the rate of ink jet flow through the print head orifices. When valve 64 is completely open ink flows through the print head cavity with negligible exiting from the print head orifices and when it is completely closed ink passing into the print head 20 issues as ink streams of nominal velocity from the orifice plate of the print head. The flow of ink through bypass line continues in the printing mode and, in the venturi embodiment, provides the motive force for withdrawal of ink from catcher 30 along lines 75, 76.

Referring again to FIG. 2, the storage and start-up station 9, in accord with the present invention, comprises a housing 30 having an air supply passage 31 and an ink sump 32 formed therein. The housing 30 is located adjacent the printing path of print head assembly so that the print head assembly can be moved to the cooperative position overlying the housing (as shown in FIG. 2) by the translational drive means 7 described with respect to FIG. 1. The housing embodiment shown in FIG. 2 is movable between the dotted-line and solid-line positions (toward and away from the print head assembly), e.g. by up-down drive 35; however, various other arrangements to provide the desired interrelations between the storage and start-up station 9 and print head assembly 5 will occur to one skilled in the art.

As shown in FIG. 2, the housing 30 includes sealing means 36 and 37 which are constructed and located to seal the interface regions of the conduit 31 and sump 32 with the print head assembly from the surrounding apparatus environment when the housing is in the upper (dotted-line position). The ink sump 32 is aligned to receive ink issuing from the orifice plate and the air conduit 31 has an outlet 38 that is aligned with an air inlet opening 18 formed in the print head assembly. The opening 18 to the print head assembly is covered by an air filter 19, which is adapted to filter air, from a source 17 of pressurized air, prior to its passage into the cavity 16, which leads to the orifice and charge plate region of the print head assembly. A ball valve 13 is biased to a normally closed position in air conduit 31 and is actuated to an open position by the pressure of the air from surce 17 when the air source is on.

The structural and functional details of the apparatus thus far described will be further understood by the following description of how it operates under the control of start-up and storage control 12, which can be, e.g., a portion of a microprocessor system (not shown) that controls the overall operation of apparatus 1. In the course of a normal printing operation sequence, print head assembly 5 is traversing across the print cylinder 3 and ink is flowing in a plurality of stabilized droplet streams from orifice plate 25, past charge plate 26. Charge is imparted to droplets by charge plate 26 in accordance with a printing information signal and non-charged drops pass to the print medium, while charged drops are deflected by an attracting electrical field into catcher 27. At this stage valve 64 is closed and ink is circulating from the catcher 27 back to cartridge 8 as described with respect to FIG. 3.

The aforementioned U.S. application Ser. No. 722,551 by M. Piatt discloses one preferred system for changing apparatus 1 from a printing or standby condition to a storage condition (e.g. for an overnight period). As disclosed in that application, start-up and storage control 12 signals drive 7 to translate the print head assembly to the position over the storage and start-up station 9 as shown in FIG. 2 (solid lines), with the charge plate operating in a catch-all-drops mode. The drive 35 is next actuated to move housing 30 into the dotted-line position shown in FIG. 2, whereby the seals 36 and 37 are forced into sealing engagement around the periphery of air inlet 18 and the printing outlet region defined by the lower surfaces of catcher 27 and wall means 28. The space surrounding print head assembly's orifice and charge plates and catcher therefore are sealed from the external atmosphere. Next, valve 64 is opened until ink flows only through the cavity outlet 29. In accord with the preferred storage mode described in U.S. application Ser. No. 722,551 by M. Piatt, the opening of valve 64 is gradual so that ink weeps through orifice plate 25 and is transported and held by capillary forces in the region defined by the operative surfaces of the charge and orifice plates 26 and 25 and the opposing surfaces of catcher 27 and wall means 28. Next, the ink supply pump 60 is shut off and the operative surfaces of the orifice and charge plate are stored in a wet condition with the entire fluid system full of ink, rather than air. The region surrounding operative surfaces of the charge plate orifice plate and catcher is thus sealed in a high vapor atmosphere so that ink drying is significantly inhibited. While the wet storage mode just described is very desirable, the start-up system of the present invention will be disclosed as it functions with that system, it must be noted that the present invention is not limited in use with a wet-stored system.

Thus, one preferred start-up mode of the present invention begins with the apparatus in the storage condition just described. Upon receipt of an appropriate start-up command, control 12 actuates pump 60 and heater 61 to circulate and heat ink with valve 64 in an open condition. After the ink has reached proper temperature, the apparatus is adjusted so that ink is sprayed from the orifices to impact on the charge plate 26 and catcher 27. One highly preferred embodiment for effecting such charge plate cleaning is to regulate the pressure of the ink jets. Thus, valve 64 is closed slowly to cause ink to spray in all directions through orifice plate 25 in a non-stable condition and impacting upon the surfaces of the charge plate 26 and catcher 27. This cleans any dirt residing on those surfaces and redissolves any ink that may have dried upon the surfaces. Alternative means can be provided to effect this impact-cleaning by the ink jets, e.g. an adjustable deflector plate can be provided in start-up station 9 and selectively moved to deflect ink jets to cleaning trajectories.

Also, in some embodiments it may be desirable to omit the drop-impacting procedure and proceed with the subsequently described air skiving mode, with wet conditioning of the charge plate provided only by the storage of wet ink thereon.

After this sequence, the apparatus functions in accord with the present invention to effect removal of the wet ink from the charge plate and catcher assembly. Thus under the control of start-up control 12 valve 64 is further closed so that the pressure in cavity 24 reaches the nominal printing pressure. The ink streams from orifice plate 26 thus shift from cleaning to printing trajectories. At this stage, air source 17 is actuated to introduce a pressurized air flow through conduit 31, air filter 19 and opening 16 into the region surrounding the orifice and charge plates.

In accord with the present invention, the print head assembly 5 is constructed to receive air from the start-up station 9 (or alternatively from an umbilical line) and direct it into a high velocity flow that skives residual wet ink from the charge plate and catcher surfaces. Thus the cavity 16 and the wall member 28 are constructed so that the passage adjacent the operative surfaces of the charge plate 26 and catcher 27 will restrict the air flow from source 17 and cause the velocity of air through that passage to be high, e.g. ten times that of the ink jet velocity. The high velocity air flow past the charge plate and catcher surface now pushes the residual ink off of the charge plate and catcher surfaces as an entire sheet. In accord with the present invention it is preferable to commence air flow at the same time ink jets are actuated to their nominal pressure. This effects removal of the ink as a sheet gains assistance from the ink viscosity. We have found this much more reliable than removing the small ink beads that form if air is not supplied approximately concurrently with the transition of the ink streams between their non-stable and stable condition.

FIGS. 4–7 illustrate one construction that is preferred in accord with the present invention to channel the air flow in the direction required to physically sweep the ink droplets off the top surface and charging face of charge plate 29 and effect charge plate drying function without adversely affecting the necessary electrostatic charging and deflection processes of the printing mode of the apparatus. That is, the air control structure directs the air flow in the desired skiving fashion while maintaining wall 28 a sufficient distance away from the charge plate to minimize its effects on drop charging and deflection. The illustrated construction also forces the ink along the outside edges of the jet array out of the local print head region.

In FIGS. 4–7, the dashed lines represent what is believed to be the air flow direction during the air skive cycle. As shown in the frontal view of FIG. 4, air from constant pressure cavity 16 is directed between the resonator 21 and the walls 80 down between the catcher 27 and wall 28. A large percentage of the total air moves along the inwardly tapered end edge surfaces 82 of the print head assembly at a high velocity. This air flow effectively removes ink from the channel adjacent the ends of the charge plate. From the top view shown in FIG. 5, it can be seen that air also moves under the orifice plate into the regions over the top of charge plate 26 and wall 28. The amount of air that passes under the orifice plate over the top surface of wall 28 is roughly twice the flow which enters over the top of the charge plate. This is effected by providing a difference in cross-sectional dimension of the respective passages 83 and 84 which are fed from the constant pressure plenum 16. This can be seen more clearly in FIGS. 6 and 7. Also, as shown in those cross-sectional side views (FIGS. 6 and 7), there is approximately a three to one difference in the distance from the wall 28 to the charge plate 29 in the center of the orifice plate (FIG. 6) and the area outside the array (FIG. 7) respectively.

The flow pattern that results from the geometry shown in FIGS. 4–7 produces Coanda wall attachment of air flow at the top edge of charge plate and causes air to flow across the electrodes on the face of charge plate 29 and effectively dry them. Also there is sufficient air flow to remove ink trapped above the charge plate 26 and wall 28. The desired skiving and drying performance of the present invention can be obtained with many other flow geometries, the geometry illustrated in FIGS. 4–7 is particularly preferred for reducing the required air flow rate, while allowing a relatively large spacing between charge plate 26 and wall 28.

Thus it will be appreciated that providing skiving and drying air from a source external of the print head (i.e. not through the ink system) is particularly effective for placing the charge plate in an operational condition in start-up modes. This approach has the advantages of not requiring air to be introduced in the ink circulation system and enhances the effectiveness of the skiving and drying.

After the charge plate has been skives of wet ink and dried by the air flow, the air source 17 is shut off and the transducer can be actuated and drop charging commence in a catch-all-drops mode. The print head assembly is now in the same operating condition in which it was prior to movement into the storage and start-up station and is ready to be moved back along the printing path for printing operation.

The invention has been described in detail with particular reference to preferred embodiments thereof, but it will be understood that variations and modifications can be effected within the spirit and scope of the invention. For example, an overstimulation of the jet streams can be utilized to effect impact of ink on the lower print head structure (e.g. the operative charge plate on catcher surfaces). Also, the flow of drying air can be pulsed in rapid pressure surges to enhance drying. The present invention can be employed not only in a start-up mode but is useful at periodic intervals during printing operation, e.g. to eliminate malfunctions or simply for preventative maintenance.

What is claimed is:

1. In continuous ink jet printing apparatus of the type having a print head with an ink cavity, an orifice plate in fluid communication with said cavity, means for supplying ink to said cavity to produce a stream(s) of ink droplets directed along a nominal printing path from said orifice plate and a charge plate located proximate the nominal path of such droplet stream(s), the improvement comprising:

(a) means for adjusting said apparatus said so that droplet stream(s) from said orifice plate impact on said charge plate;

(b) air skiving means for producing a high velocity air flow, from a location external of said orifice plate, across said charge plate; and (c) control means for: (i) controlling said adjusting means to selectively vary the droplet stream between nominal and impacting conditions and (ii) controlling said air skiving means between active and inactive conditions.

2. The invention defined in claim 1 wherein said control means effects commencement of said skiving air flow across said charge plate approximately concurrently with the termination of said droplet impact on said charge plate.

3. The invention defined in claims 1 or 2 wherein said adjusting means comprises means for regulating said ink supplying means.

4. The invention defined in claims 1 or 2 wherein said print head cavity and said orifice and charge plates are movable as a unitary print head assembly across a printing path and to a start-up station adjacent said printing path and said air skiving means includes:

(i) air source means selectively couplable to print head assembly at saod start-up station; and (ii) air directing means constructed in said print head assembly for coupling to said air source means and directing air therefrom into said high velocity air streams.

5. In continuous ink jet printing apparatus of the type having a print head assembly, including (i) an ink cavity, (ii) an orifice plate and (iii) a droplet-charging plate, and ink supply means for providing ink to said cavity to produce printing streams of ink droplets from said orifice plate, the improvement comprising:

(a) conditioning means for effecting an ink wetting of said charge plate; and (b) air skiving means for producing a high velocity air flow, from a location external of said orifice plate, across said charge plate;

said print head assembly being movable across a printing path and to a start-up station adjacent said printing path and said air skiving means including:

(i) air source means selectively couplable to the print head assembly at said start-up station; and (ii) air directing means constructed in said print head assembly for coupling to said air source means and directing air therefrom into said high velocity air streams.

6. The invention defined in claim 5 wherein said conditioning means includes means for supporting a mass of ink in contact with said charge plate.

7. The invention defined in claim 5 wherein said conditioning means comprises means for adjusting said apparatus so that droplet stream(s) from said orifice plate impact on said charge plate.

8. The invention defined in claim 7 wherein said adjusting means comprises means for regulating said ink supplying means.

9. The invention defined in claim 8 further comprising control means for: (i) controlling said adjusting means to selectively vary the droplet stream between nominal and impacting conditions and (ii) controlling said air skiving means between active and inactive conditions.

10. The invention defined in claim 9 wherein said control means effects commencement of said skiving air flow across said charge plate approximately concurrently with the termination of said droplet impact on said charge plate.

11. The invention defined in claim 5 wherein said start-up station includes (i) means for sealing impacting ink droplets within the start-up station and (ii) means for returning ink from said start-up station to an ink supply reservoir.

12. In continuous ink jet printing apparatus of the type having a print head with an ink cavity, an orifice plate in fluid communication with said cavity, means for supplying ink to said cavity to produce a stream(s) of ink droplets directed along a nominal printing path from said orifice plate and a charge plate located proximate the nominal path of such droplet stream(s), the improvement comprising:

(a) means for regulating the ink pressure in said apparatus between a first condition wherein such stream(s) are directed on said nominal path and a second condition, of reduced pressure, wherein the droplet stream(s) from said orifice plate impact on said charge plate;

(b) means for removing wet ink from said charge plate with such streams in said first condition; and (c) control means for: (i) controlling said regulating means to selectively vary such droplet stream(s) between said first and second conditions and (ii) controlling said wet ink removing means between active and inactive conditions.

13. The invention defined in claim 12 wherein said print head cavity and said orifice and charge plates are movable as a unitary print head assembly across a printing path and to a start-up station adjacent said printing path and wherein said start-up station includes (i) means for sealing impacting ink droplets within the start-up station, and (ii) means for returning ink from said start-up station to an ink supply reservoir.

14. In ink jet printing apparatus of the type having a print head with an ink cavity, an orifice plate in fluid communication with said cavity, means for discharging ink droplets directed along a nominal printing path from said orifice plate and a lower print head structure located proximate the nominal path of such droplet stream(s), the improvement comprising:

(a) means for adjusting said apparatus so that droplet stream(s) from said orifice plate impact on said lower print head structure;

(b) air skiving means for producing a high velocity air flow, from a location external of said orifice plate, across said lower print head structure; and (c) control means for: (i) controlling said adjusting means to selectively vary the droplet stream between nominal and impacting conditions and (ii) controlling said air skiving means between active and inactive conditions.

15. The invention defined in claim 14 wherein said control means effects commencement of said skiving air flow across said lower structure approximately concurrently with the termination of said droplet impact on said lower structure.

16. In continuous ink jet printing apparatus of the type having a print head with an ink cavity, an orifice plate in fluid communication with said cavity, means for supplying ink to said cavity to produce a stream(s) of ink droplets directed along a nominal printing path from said orifice plate and a charge plate located proximate the nominal path of such droplet stream(s), the improvement comprising air skiving means for producing a high velocity air flow, from a location external of said orifice plate, across said charge plate;

said print head orifice plate and charge plate being movable as an assembly across a printing path and to a start-up station adjacent said printing path and said air skiving means including:

(i) air source means selectively couplable to the print head assembly at said start-up station; and (ii) air directing means constructed in said print head assembly for coupling to said air source means and directing air therefrom into high velocity air streams.

* * * * *